United States Patent [19]

Montagu

[11] 4,329,606
[45] May 11, 1982

[54] ELECTRIC MOTOR CONSTRUCTION

[75] Inventor: Jean I. Montagu, Brookline, Mass.

[73] Assignee: General Scanning, Inc., Watertown, Mass.

[21] Appl. No.: 102,023

[22] Filed: Dec. 10, 1979

[51] Int. Cl.³ .............................................. H02K 1/06
[52] U.S. Cl. ..................................... 310/71; 310/112; 310/156; 310/67 R
[58] Field of Search .................. 310/67, 156, 112, 74, 310/163, 257, 49, 71, 40 MM, 68 D, 164, 165, 166; 318/817, 794, 795, 751, 752; 29/596

[56] References Cited

U.S. PATENT DOCUMENTS

| Re. 28,075 | 12/1967 | Kavanaugh | 310/67 |
|---|---|---|---|
| 638,643 | 12/1899 | Newman et al. | 310/67 R |
| 2,967,346 | 1/1961 | McMaster et al. | 310/42 |
| 3,253,169 | 5/1966 | Haydon et al. | 310/156 |
| 3,256,453 | 6/1966 | Haydon | 310/156 |
| 3,416,015 | 12/1968 | Ordas | 310/49 |
| 3,493,800 | 2/1970 | Barrett | 310/67 R |
| 4,185,215 | 1/1980 | Montagu | 310/156 |

Primary Examiner—J. D. Miller
Assistant Examiner—D. L. Rebsch

[57] ABSTRACT

A subfractional horsepower, permanent magnet motor has a stator assembly with a pair of axially aligned stator coils in stacked relation, and complementary metal housing members that enclose the coils and define a series of stator poles. An elongated sleeve disposed within the annular stator assembly provides, with the metal housing members, magnetic circuits that surround the stator coils. The stator sleeve is disposed over and interfitted with a frame core that has significantly greater thermal conductivity than the thermal conductivity of the stator sleeve. A channel extends from at least one of the stator coils along the axial length of the core to the base, and the leads of that coil extend radially inward from the coil and along the channel to the base and therefrom externally of the motor. The motor rotor has a cylindrical sleeve portion with a circumferential array of axially extending permanently magnetized rotor poles equally spaced about the periphery, and the rotor is supported such that a uniform annular air gap is provided between the outer surface of the stator assembly and the inner surface of the rotor sleeve.

19 Claims, 7 Drawing Figures

ELECTRIC MOTOR CONSTRUCTION

This invention relates to inverted electric motor constructions in which the rotor surrounds or encases the stator. Such constructions have been used where high inertia and constant speed is required as in gyroscope units, but their use has been infrequent because of poor heat dissipation characteristics, high cost, and starting difficulties. In order to achieve self starting in a certain fifty/sixty Hertz "inverted" prior motor, for instance, it was necessary to mount the stator windings on an angularly compliant support which itself was mounted on the motor case.

The "inverted motor" design has not been commercially applied to low cost, subfractional synchronous or stepper motors. Such motors have numerous applications including use as reversible motors for tape drives and computer peripherals and as stepper motors for strip chart drives and printers. Size, weight and cost of manufacture are important factors for such motors.

An object of the invention is to provide improved "inverted motor" constructions, especially motor constructions that are simple and inexpensive to manufacture and assemble, and in particular new subfractional synchronous and stepper motor constructions of the inverted type.

DESCRIPTION OF THE INVENTION

In accordance with the invention there is provided a subfractional horsepower, permanent magnet motor that has a permanent magnet rotor with a cylindrical sleeve portion that defines a plurality of permanently magnetized rotor poles, and a shaft that supports the rotor for rotation about the axis of said rotor. The motor frame includes a rotor shaft support core that extends into the internal volume defined by the rotor sleeve. Mounted within the rotor sleeve and on the rotor shaft support core is an annular stator assembly such that there is an annular air gap between the outer peripheral surface of the stator assembly and the inner peripheral surface of the rotor sleeve. The stator assembly includes annular coil means mounted on a common axis and magnetically permeable material that provides a circumferential array of spaced stator poles around the coil means that extend parallel to the motor axis. The magnetic circuit structure includes an inner magnetically permeable sleeve portion (which may be integral with other portions of the magnetic circuit structure) at the inner periphery of the coil means that is disposed over and in interfitted heat conductive engagement with the support core. The shaft support core is of material that has greater thermal conductivity then the inner sleeve portion and heat generated in the coil means during operation of the motor passes inwardly through the magnetically permeable sleeve portion to the heat conducting core and then flows axially through the core and out of the motor in effective heat-dissipating action.

In preferred embodiments, the pair of annular stator coils are axially aligned in stacked relation, and complementary housing members enclose the coils and define a series of stator poles equally spaced around the outer periphery of the annular stator assembly. Each housing member has a base plate portion with a central aperture therein, and an elongated sleeve disposed within the annular stator assembly and in engagement with the inner peripheral surface of each base plate aperture. The sleeve provides with the metal housing members magnetic circuits that surround said stator coils. The motor frame comprises a base plate integral with the core. A heat conductive cover, surrounding the rotor and fitted tightly to the base for good heat transfer, serves to radiate away heat transmitted to it by the coils via the core and base plate. The motor frame is made of materials such as aluminum, brass, and zinc and alloys thereof and the thickness of the base and of the core is preferably greater than ten percent of the outer diameter dimension of the motor. A channel extends from at least one of the stator coils along the axial length of the core to the base plate, and the leads of that coil extend radially inward from the coils and along the channel to the base plate and therefrom externally of the motor.

In a particular embodiment, the rotor sleeve is composed of magnetic particles embedded in a plastic matrix and magnetized to define a series of axially extending rotor poles about its periphery; and has an internal diameter of less than three centimeters, and a radial wall thickness of less than five millimeters. Optionally the rotor may include an inertial damper. The stator sleeve is preferably a sheet of magnetically permeable steel formed as a cylinder with an axial slot and includes tab portions that mechanically secure the stator coils together in stacked relation. Each stator coil is wound on a bobbin and each bobbin has an end flange in which are formed channels for guiding coil leads to the inner periphery of the stator coil. Preferably, a first capacitor is connected in series between the two stator coils and a second, fine tuning capacitor connected in parallel with one of the stator coils to provide a current phase shift of about 90 degrees between the two stator coils.

The invention provides a motor construction that is compact in size, solves heat dissipation problems, is simple, and avoids the problems of inertia lock without torque loss penalty. Among the advantages of "inverted motor" configurations in accordance with the invention are high torque output for a given size; and lower cost, for example, the cost of copper is a significant fraction of the total motor cost.

Other features and advantages of the invention will be seen as the following description of a particular embodiment progresses, in connection with the drawings, in which.

DESCRIPTION OF PARTICULAR EMBODIMENT

Figure 1:
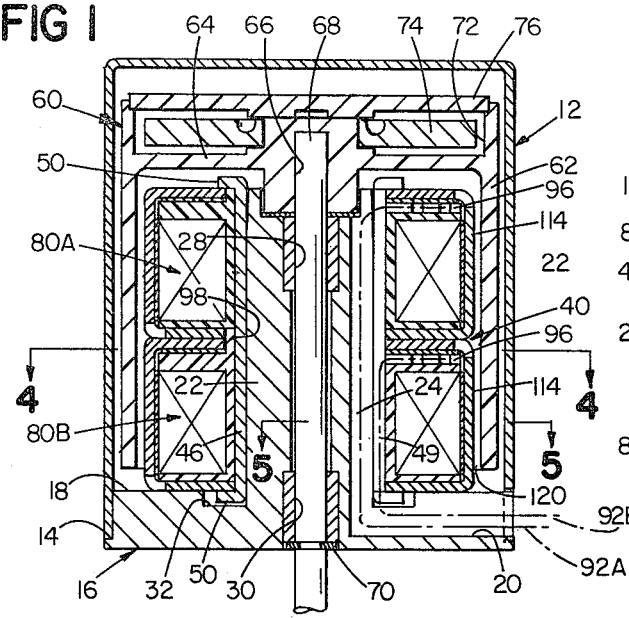
FIG. 1 is a longitudinal sectional view of a subfractional horsepower reversible electric motor in accordance with the invention.
Figure 2:
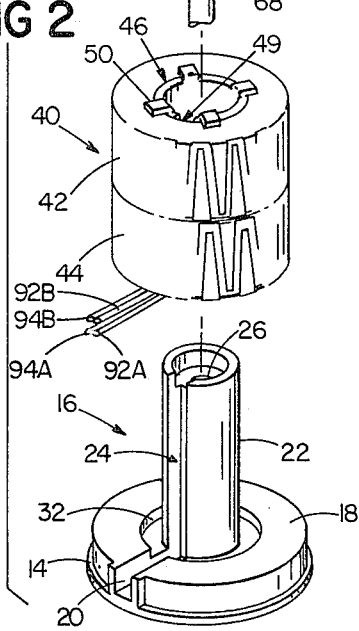
FIG. 2 is an exploded view of the motor shown in FIG. 1.

Shown in the sectional view of FIG. 1 and the exploded view of FIG. 2 is a reversible, subfractional horsepower, permanent magnet electric motor that has a diameter of about three centimeters and a height of about four centimeters. The motor is designed for energization by a 110 volt, 60 Hertz source and has an output torque of about two inch-ounces. It is suitable for use as either a synchronous motor or a stepper motor. The motor includes a cylindrical drawn aluminum cover 12 that is tightly seated on rim 14 of zinc diecast frame member 16 in good heat transfer contact therewith. Frame member 16 has a cylindrical base portion 18 (about one-half centimeter high) in which is formed a radially extending groove 20 an an integral upstanding cylindrical core portion 22 that has a diameter of about one centimeter and a height of about 2.2 centimeter. Core 22 has an axially extending groove 24 in its outer wall. It also has a coaxial internal bore 26 in which shaft bearings 28, 30 are press fitted. An annular recess 32 is formed in base portion 18 around the lower end of core portion 22, and the upper end of core 22 has a slight taper.

Mounted on core 22 is a stator assembly 40 that includes two stator coil subassemblies 42, 44 and a magnetically permeable steel sleeve 46 that has an inner diameter of about one centimeter, a length of about 2.5 centimeters and a wall thickness of about 0.8 millimeter. The stator coil subassemblies 42, 44 are stacked on sleeve 46 and sleeve tabs 50 are bent outwardly to secure the stator assembly together. Stator assembly 40 is pressed over core 22 with the inner surface of sleeve 46 in firm heat conducting engagement with the outer surface of core 22.

Rotor 60 includes a thin-walled cylindrical sleeve 62 that is about 2.5 centimeters in length, about three centimeters in outer diameter, and one quarter centimeter in wall thickness. The rotor sleeve comprises a large number of magnetic particles (e.g., barium ferrite, samarium cobalt, or Alnico 8) embedded in a bonding matrix of rigid synthetic material (e.g., nylon) and magnetized to define twenty-four axially extending rotor poles (twelve pole pairs) about the periphery of rotor sleeve 62. Integral support disc 64 at one end of sleeve 62 includes socket 66 that receives the upper end of motor shaft 68. Shaft 68 extends through bore 26 and is supported by sleeve bearings 28, 30 and secured by snap ring 70. In the illustrated embodiment, support disc 64 defines a recess 72 which houses brass inertial damper disc 74 which is supported for rotation in damping oil. Recess 72 is closed by cover 76.

Figure 4:
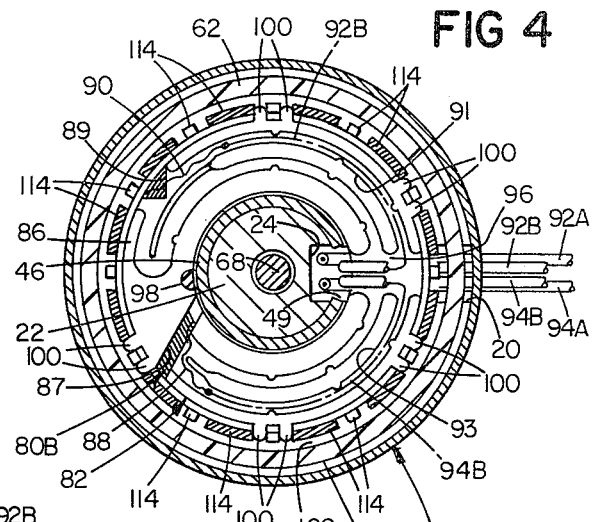
FIG. 4 is a transverse sectional view taken along the line 4—4 of FIG. 1.
Figure 3:
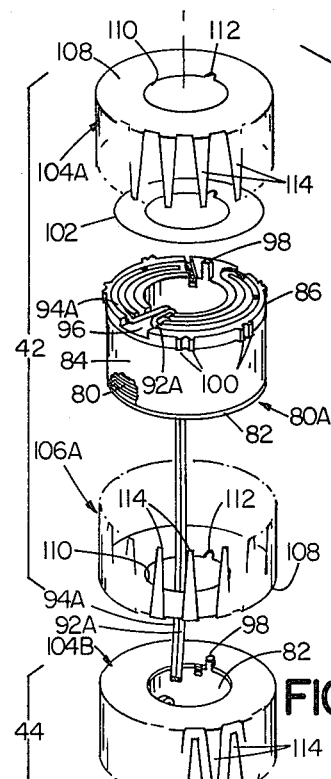
FIG. 3 is an exploded view of components of the stator assembly of the motor shown in FIG. 1.
Figure 6:
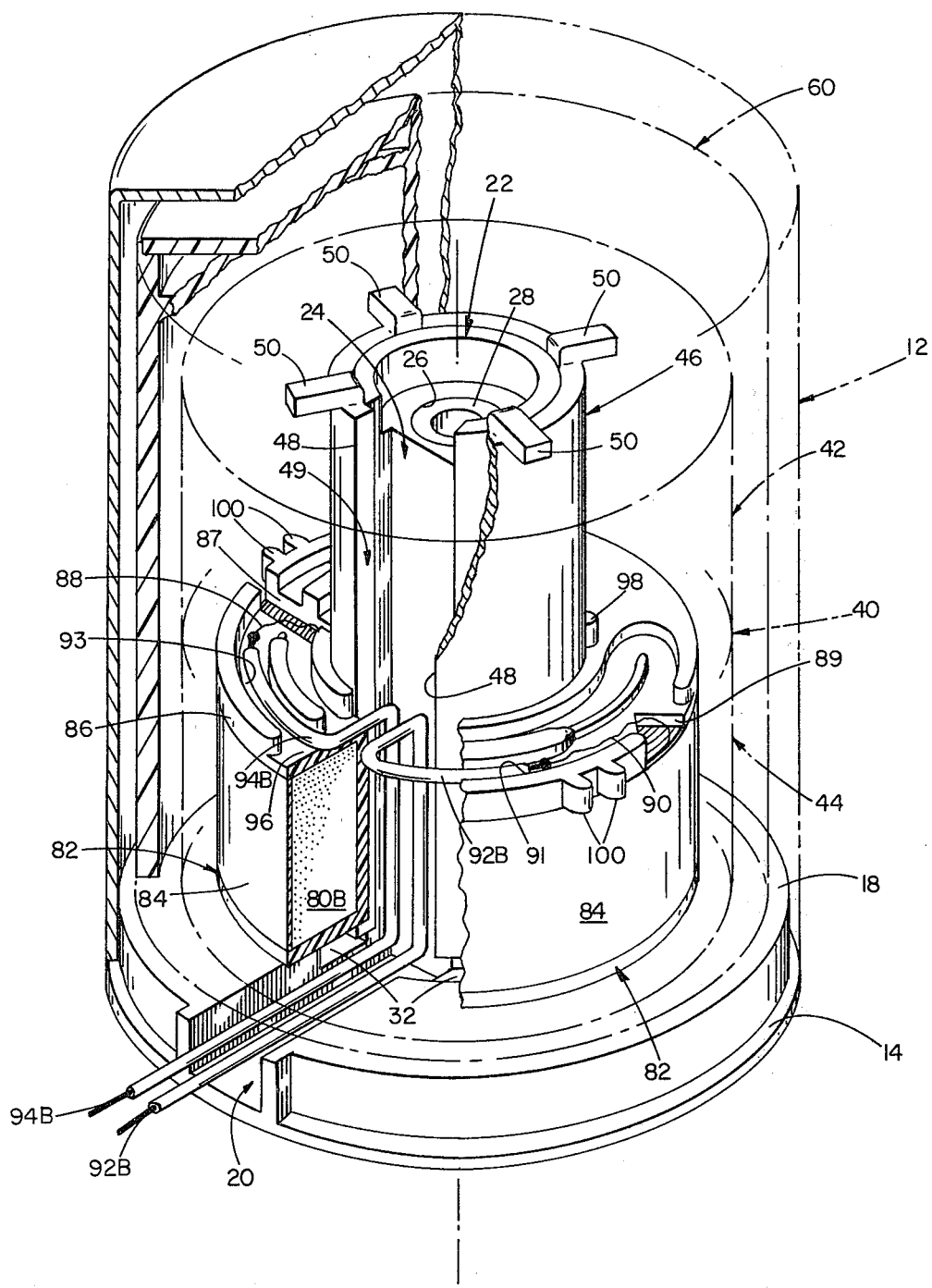
FIG. 6 is a perspective view of portions of the motor shown in FIG. 1, with parts broken away.

With reference to the exploded view of FIG. 3 and the views of FIGS. 4 and 6, each stator coil subassembly includes a coil 80 of about 4000 turns of 41 gauge copper wire that are wound on plastic bobbin 82 and secured by a strip of protective tape 84. The upper flange 86 of each bobbin 82 has a radial slot 87 through which is led the inner end 88 of coil 80 and a peripheral notch 89 through which is led the outer end 90 of coil 80. Formed in flange 86 is first arcuate groove 91 in which lead 92 (connected to the outer end 90 of coil 80) is disposed and a second arcuate groove 93 in which lead 94 (connected to the inner end 88 of coil 80) is disposed. Radially extending recess 96 in flange 86 provides an inward passage for the leads 92 and 94 from grooves 91 and 93 to the inner periphery of bobbin 82. Each flange 86 also includes an upstanding indexing projection 98 at its inner periphery and pairs of aligning projections 100 spaced about its outer periphery. (The positions of slot 87, notch 89, and projection 98 have been shifted angularly in FIG. 6 for clarity of illustration.) An insulator sheet 102 overlies upper flange 86.

Each stator coil subassembly also includes two magnetically permeable steel complementary housing members 104, 106 that enclose coil 80. Each housing member has an annular base plate portion 108 with a cylindrical aperture 110 in which is formed an aligning notch 112 and a series of integral stator poles 114 that extend at right angles from bend junctions at the outer periphery of the base plate portion 108. The two complementary housing members 104, 106 are interfitted in axially sliding relation over coil 80 with the tips of certain poles 114 of the lower housing member received between aligning projections 100 of flange 86 and with notch 112 of the upper housing member 104 received over upstanding tab projection 98. The pole members 114 of the upper housing member 104 are interfitted between the pole members 114 of the lower housing member in accurate, equally spaced angular alignment to provide an annular array of twenty four stator poles.

The two stator coil subassemblies 42, 44 are then disposed in stacked relation with tab 98 of the lower subassembly 44 disposed in aligning notch 112 of the lower housing member 106 of the upper subassembly 42 (as indicated in FIG. 1) so that the annular array of stator poles 114 of upper subassembly 42 is at an angular offset of 7½ degrees from the annular array of stator poles 114 of the lower subassembly 44. Sleeve 46 is inserted through apertures 110 of the housing members 104, 106 and upper and lower tabs 50 are bent outwardly over the housing members to secure the two stator coil subassemblies together as a unit as shown in FIG. 2. Sleeve 46 firmly engages the housing members 104, 106 and completes magnetic circuits that surround each stator coil. Axially extending edge surfaces 48 of sleeve 46 are spaced apart about ½ centimeter and define an axially extending slot 49 therebetween in which leads 90 and 94 of each coil are disposed.

Figure 5:
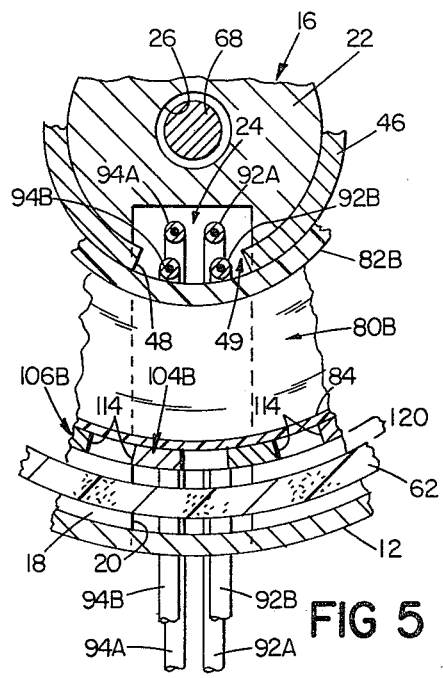
FIG. 5 is a transverse sectional view taken along the line 5—5 of FIG. 1.

Stator assembly 40 is then slid onto core 22 and seated on base 18 with slot 49 of sleeve 46 aligned with groove 24 of core 22 to form a channel for the leads. Coil leads 92, 94 are disposed in this axially extending channel and are brought out through radially extending groove 20 at the bottom of groove 24 so that the lead ends emerge from the frame. Sleeve 62 of rotor 60 is then positioned over the stator assembly with rotor shaft 68 extending through core 22 and secured in position with snap ring 70 such that annular air gap 120 is provided between the outer surfaces of stator poles 114 and the inner surface of rotor sleeve 62, as shown in FIGS. 4 and 5. In particular, by thus disposing the coil leads 92 and 94 in the channel formed by the axially extending slot 49 between edge surfaces 48 of magnetic circuit sleeve 46 and groove 24 in heat conductor core 22, compactness and efficiencies in construction are achieved.

Figure 7:
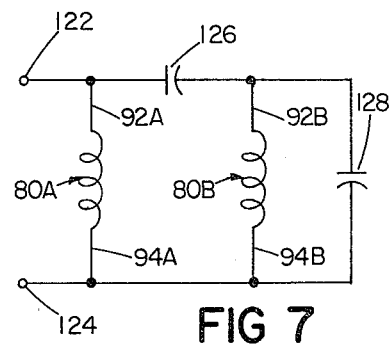
FIG. 7 is a schematic diagram showing interconnection of the stator coils in the motor of FIG. 1.

Shown in FIG. 7 is an interconnection of the upper and lower coils 80A and 80B to provide the necessary current phase shift between them when a single phase source of alternating current is connected at terminals 122, 124. 0.2 microfarad capacitor 126 is connected between leads 92A and 92B, and 0.1 microfarad capacitor 128 is connected between leads 92A and 94B.

During operation, heat generated in the coils passes radially inwardly through magnetic circuit sleeve 46, thence to heat conductive core 22. The heat then flows axially to the enlarged base 18 of the frame. Some of the heat can be radiated or conducted from the end face of base 18; but much of the heat now flows radially outward in base 18 and into the tightly fitted aluminum cover 12, and the cover serves to radiate away much of the heat of the coils.

While a particular embodiment of the invention has been shown and described, numerous modifications will be apparent to those skilled in the art, and therefore it is not intended that the invention be limited to the disclosed embodiment or to details thereof, and departures may be made therefrom within the spirit and scope of the invention.

What is claimed is:

1. A subfractional horsepower, permanent magnet motor comprising an annular stator assembly comprising a pair of axially aligned annular stator coils in stacked relation, complementary housing members enclosing said coils and defining a series of stator poles equally spaced around the outer periphery of said annular stator assembly, each said housing member having a base plate portion with a central aperture therein, an elongated sleeve portion disposed within said annular stator assembly and in engagement with the inner peripheral surface of each said base plate aperture of said metal housing members to provide with said metal housing members magnetic circuits that surround said stator coils, a motor frame comprising a base and a core upstanding from said base, a passage in said core for receiving a motor shaft, the thermal conductivity of said core being significantly greater than the thermal conductivity of said sleeve portion, said sleeve portion being disposed over and interfitted with said core, an axial channel that extends inside at least one of said stator coils along the axial length of said core to said base, the leads of said one coil extending radially inward from said one coil into said channel and along said channel to said base and extending therefrom externally of said motor, a rotor having a cylindrical sleeve portion with a circumferential array of axially extending permanently magnetized rotor poles equally spaced about the periphery of said rotor sleeve, a motor shaft secured to said rotor and disposed within said passage in said core for supporting said rotor for rotation about said stator assembly with a uniform air gap between the outer surface of said stator assembly and the inner surface of said rotor sleeve.

2. An electric motor comprising a permanent magnet rotor having a cylindrical sleeve portion defining a plurality of permanently magnetized rotor poles, a shaft supporting said rotor for rotation about the axis of said rotor, a motor frame including a rotor shaft support core extending into the internal volume defined by said rotor sleeve, an annular stator assembly mounted within said rotor sleeve on said rotor shaft support core with an annular air gap between the outer peripheral surface of said stator assembly and the inner peripheral surface of said rotor sleeve, said stator assembly including annular coil means mounted on a common axis and magnetic circuit structure of magnetically permeable material that defines a circumferential array of spaced stator poles around said coil means extending parallel to said axis, and provides a magnetic circuit about said coil means, said magnetic circuit structure including an inner magnetically permeable sleeve portion at the inner periphery of said coil means, said shaft support core being of material having greater thermal conductivity than said inner sleeve portion, and said inner sleeve portion being disposed over and in heat conductive engagement with said support core such that heat generated in said coil means passes inwardly through said magnetically permeable sleeve portion to said heat conducting core and then flows axially through said core, and out of said motor.

3. The motor of claim 2 wherein said motor frame is a one piece member made of a material selected from aluminum, brass and zinc and alloys thereof and has a groove extending along its axial length in which coil leads are disposed.

4. The motor of claim 1 or 2 including a heat conductive and radiative cover surrounding said rotor and in heat conductive relation with said core.

5. The motor of claim 1 or 2 wherein said frame is made of a material selected from aluminum, brass, and zinc and alloys thereof and said magnetic circuit sleeve portion has greater magnetic permeability than said core.

6. The motor of either claim 1 or 2 wherein a stator coil is wound on a bobbin which has an end flange in which are formed channels for guiding coil leads to the inner periphery of the stator coil.

7. The motor of either claim 1 or 2 wherein said core has an axially extending groove therein and said sleeve portion has an axially extending slot aligned with said groove to define an axially extending channel in which coil leads are disposed.

8. The motor of any one of claims 1–3 wherein the radial thickness of the rotor sleeve is less than five millimeters and said rotor sleeve includes a multiplicity of magnetic particles embedded in a plastic matrix and magnetized to define said series of axially extending rotor poles about its periphery.

9. The motor of any one of claims 1–3 wherein said rotor sleeve has an internal diameter of less than three centimeters.

10. The motor of either claim 1 or 2 wherein said rotor is of cup shape and said rotor sleeve portion has an axial length at least as long as the axial length of said stator assembly so that said rotor poles overlap all of said stator poles.

11. The motor of any one of claims 1–3 and further including an inertial damper integral with said rotor.

12. The motor of either claim 1 or 2 and further including a first capacitor connected in series between two stator coils and a second, smaller, fine tuning, capacitor connected in parallel with one of said stator coils to provide a current phase shift of about 90 degrees between the two stator coils.

13. The motor of claim 1 wherein each housing member has a series of spaced apart upstanding tooth portions integral with and extending at right angles from the outer periphery of said base plate portion, the two complementary housing members being interfitted in an axially sliding relation with one another to define said series of stator pole portions and the pole portions of one stator coil being angularly offset from the pole portions of the other stator coil.

14. The motor of claim 13 wherein each said stator coil is wound on a bobbin, each said bobbin having a plurality of angular alignment projections including at least one axially extending projection and at least one radially extending projection.

15. The motor of claim 5 wherein the outer diameter of said heat conductive core is greater than twenty percent of the outer diameter of said motor.

16. The motor of claim 1 or 2 wherein said sleeve portion of said stator assembly has tab portions that mechanically secure two stator coils together in stacked relation.

17. The motor of claim 16 wherein said sleeve portion is of sheet material formed into cylindrical shape with spaced axial edges that define an axially extending slot through which leads of a said coil extend.

18. The motor of claim 17 wherein said rotor sleeve has an internal diameter of less than three centimeters, and the radial thickness of the rotor sleeve is less than five millimeters and said rotor sleeve includes a multiplicity of magnetic particles embedded in a plastic matrix and magnetized to define said series of axially extending rotor poles about its periphery and further including a heat conductive and radiative cover surrounding said rotor and in heat conductive relation with said core.

19. The motor of claim 18 wherein said motor frame is a one piece member and its core portion has a groove extending along its axial length in which stator coil leads are disposed.

* * * * *